United States Patent [19] [11] 3,874,250
Duer [45] Apr. 1, 1975

[54] LIMITED SLIP DIFFERENTIAL

[75] Inventor: Morris J. Duer, Lansing, Mich.

[73] Assignee: General Motors Corporation, Detroit, Mich.

[22] Filed: Oct. 24, 1973

[21] Appl. No.: 409,334

[52] U.S. Cl. .................................. 74/711, 74/713
[51] Int. Cl. ............................................. F16h 1/44
[58] Field of Search .......... 74/710, 710.5, 711, 713

[56] References Cited
UNITED STATES PATENTS

| 3,208,306 | 9/1965 | Lewis | 74/711 |
| 3,400,611 | 9/1968 | Engle | 74/710.5 |
| 3,477,312 | 11/1969 | Duer | 74/711 |
| 3,495,298 | 2/1970 | Engle et al. | 74/711 X |
| 3,527,120 | 9/1970 | Duer et al. | 74/711 |
| 3,580,108 | 5/1971 | Mieras | 74/711 |
| 3,624,717 | 11/1971 | Brubaker | 74/711 |

Primary Examiner—Samuel Scott
Assistant Examiner—Lance W. Chandler
Attorney, Agent, or Firm—Robert M. Sigler

[57] ABSTRACT

A limited slip differential includes a clutch loading and axle shaft retaining spring which comprises a pair of parallel flat metal plates joined at one end of each by a resilient center plate having an omega-shaped configuration which surrounds the differential pinion shaft and biases the parallel plates outward against the differential side gears. Each of the parallel plates has a slot for engagement with one of the axle shafts for retention of the latter in the differential casing.

1 Claim, 5 Drawing Figures the pair of clutch plates 36.

LIMITED SLIP DIFFERENTIAL

BACKGROUND OF THE INVENTION

My invention relates to an improved spring and axle shaft retaining means for a vehicle mounted limited slip differential. It is primarily designed for use with a limited slip differential which includes an engine driven rotatable casing, axle shafts rotatably received within the casing, a gear train within the casing including a side gear splined to each axle shaft and clutch means between one or both side gears and the casing to limit differential action.

Such differentials generally include some type of spring means in the casing to bias the side gears outward and thus load the clutch means. The operation of the limited slip differential is affected by the force exerted by the spring means which, of course, varies with the degree of spring compression. As dimensions vary in manufacture and clutches wear with use, the compression, and thus the exerted force, of the spring means changes. It is thus advantageous to use a spring with a relatively small spring rate, defined as the change in exerted force per unit compressed distance, to minimize this change. However, because of the large force and small size required of such a spring, most springs used in differentials tend to be quite stiff with a large spring rate.

SUMMARY OF THE INVENTION

My invention embodies a spring for a limited slip differential with a comparatively small spring rate. My spring has the additional advantage of always presenting flat, parallel faces to the side gears to load the clutches evenly. My spring has the further advantage of having slots formed therein for cooperation with the inner end of the axle shaft for retention thereof within the differential casing.

All these and other advantages are found in the spring comprising a long metal plate formed into two parallel plates joined by a center portion which has a generally omega-shaped configuration. The center portion forms a partially open cylinder; and the spring is placed in the differential casing with the pinion shaft inserted in the cylinder and each of the parallel plate portions bearing outwardly against one of the side gears. Each parallel plate portion has a slot cut therein for cooperation with a groove on the inner end of the axle shaft to retain the end of the axle shaft within the differential casing. Further details and advantages of my invention will be apparent from the drawings and the following description of the preferred embodiment.

DESCRIPTION OF THE PREFERRED EMBODIMENT

Figure 1:
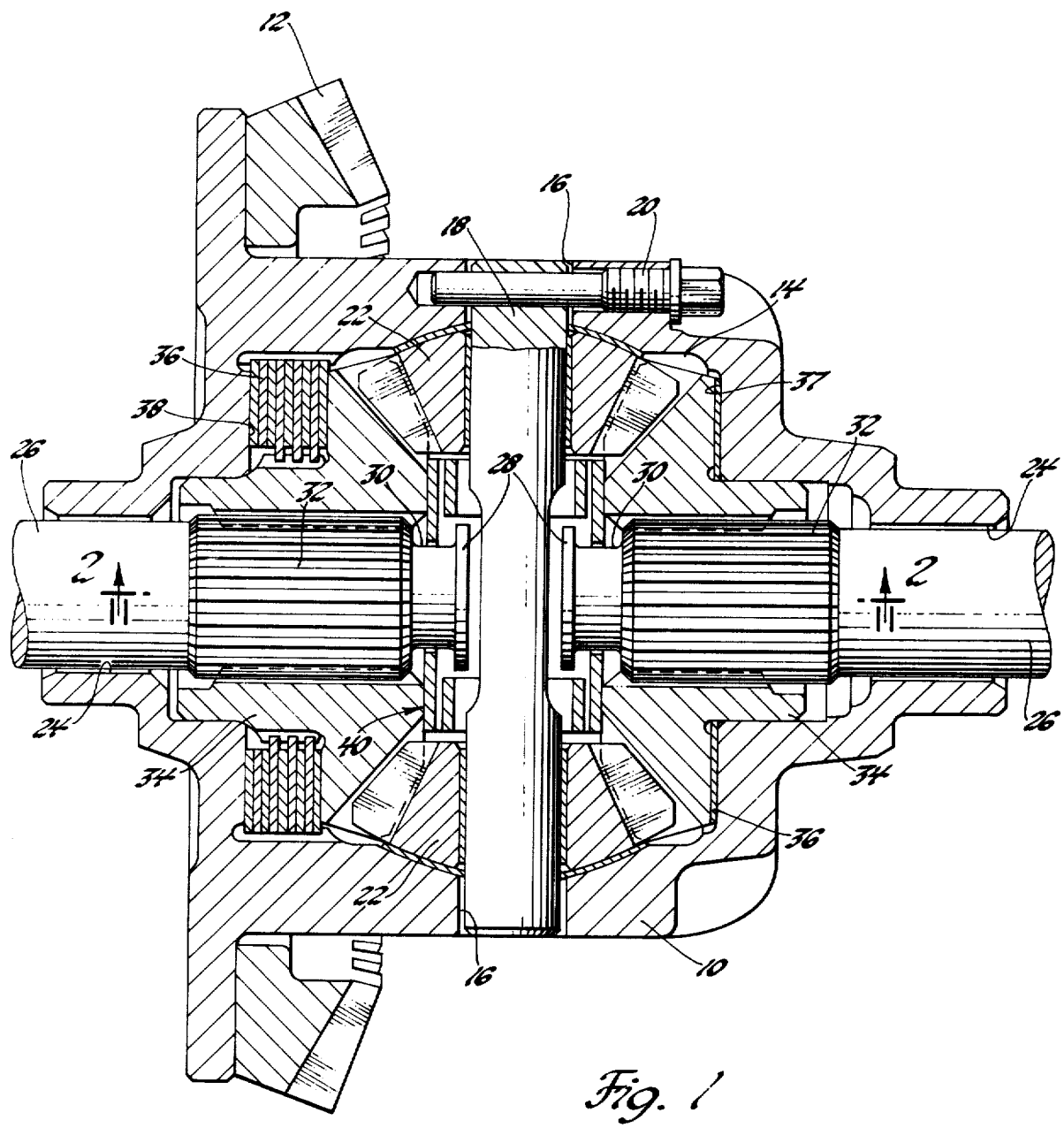
FIG. 1 shows a preferred embodiment of my invention in its environment.

Referring to FIG. 1, a differential mechanism has a casing 10 with an attached ring gear 12, whereby it can be rotatably driven by a vehicle engine through shaft and gear means not shown. The casing 10 has a central cavity 14 therein and diametrically opposed openings 16 therethrough. A pinion gear 22 is rotatably mounted near each end of the pinion shaft 18 within the central cavity 14.

The casing 10 has a further pair of diametrically opposed openings 24, each of which rotatably receives the inner end of the axle shaft 26. Each axle shaft 26 has formed thereon, proceeding from the inner end, an axle button 28, a circumferential groove 30 and a splined portion 32. A pair of side gears 34, one splined to the splined portion 32 of each axle shaft 26, meshes with the pinion gears 22 to form a standard differential gear train.

Clutch means 36 are included between one or both side gears 34 and annular surfaces 38 on the inside of the casing 10. In the embodiment shown, the clutch means, on one side only, is a set of clutch plates alternatingly connected to the side gear 34 and casing 10; while a single spacer 37 is included between the side gear 34 and casing 10 on the other side. Of course, other clutch arrangements are well known to those skilled in the art.

Figure 2:
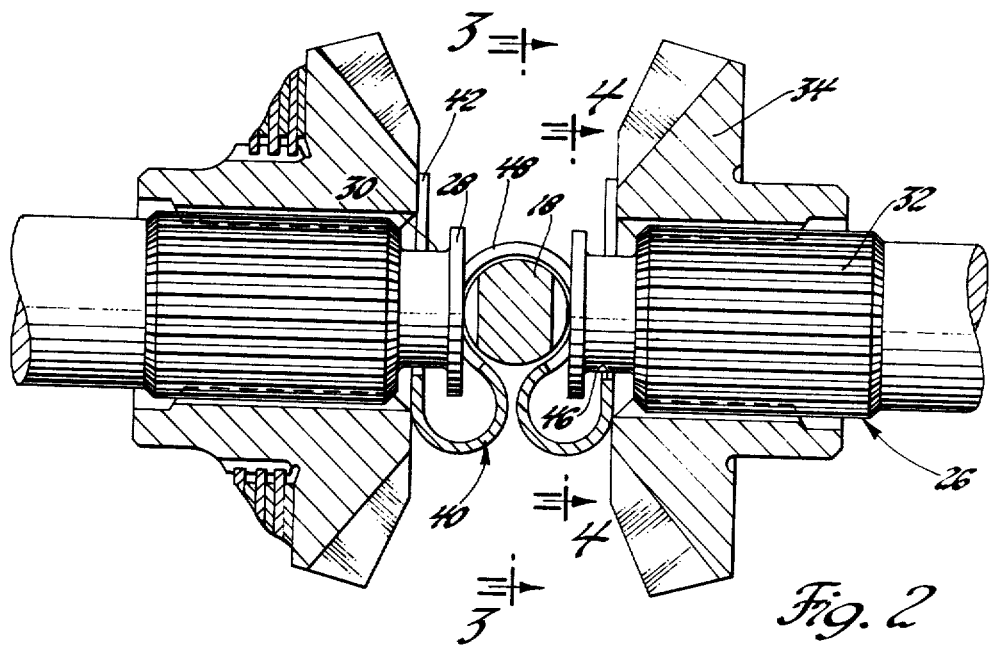
FIG. 2 is a section view along line 2—2 in FIG. 1.
Figure 5:
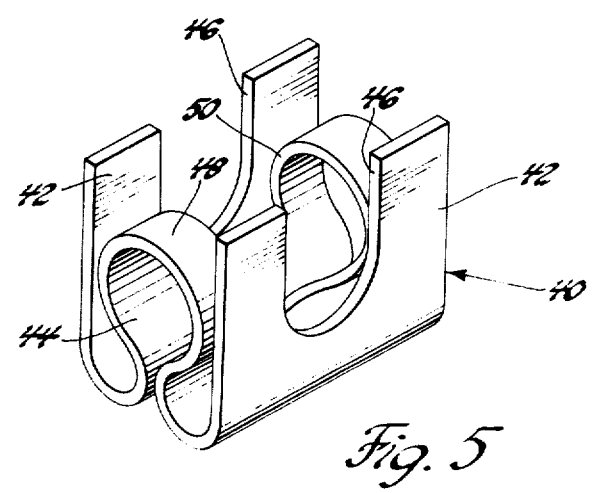
FIG. 5 shows the spring used in the apparatus of FIGS. 1 – 4.

The clutch means 36 create a frictional drag between the side gears 34 and the casing 10 which is approximately proportional to an outwardly biasing force exerted on the side gears 34 by a spring 40, shown by itself in FIG. 5. The spring 40 is formed from a single rectangular piece of metal such as steel into a pair of parallel plate portions 42 connected by a resilient central portion 44 having an upper case omega-shaped configuration as shown in FIG. 2. Slots 46 are cut into the parallel plate portions 42 from each end of the spring 40.

Figures 3, 4:
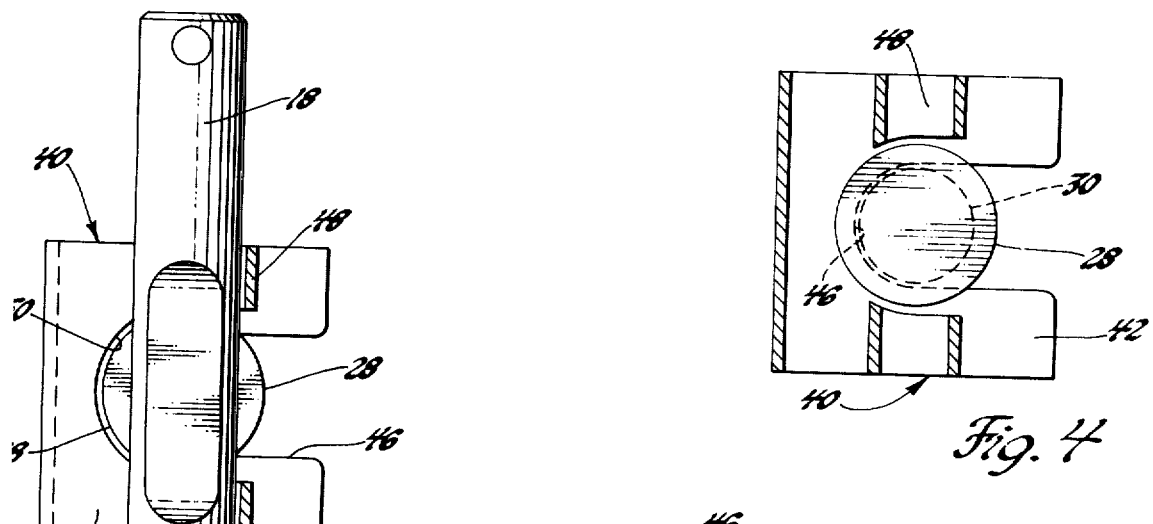
FIG. 3 is a section view along line 3—3 in FIG. 2.
FIG. 4 is a section view along line 4—4 in FIG. 2.

The central portion 44 of the spring 40 forms, as part of the omega, an incompletely closed cylindrical portion 48. The spring 40 is retained in the central cavity 14 with the pinion shaft 18 inserted within the cylindrical portion 48. The spring 40 is compressed, with each of the parallel plate portions 42 bearing outwardly against one of the side gears 34, as shown in FIG. 2. As can be seen in FIGS. 1 and 4, the width of the slot 46 is great enough so that the grooved portion 30 of the axle shaft 26 can be inserted therein, but is smaller than the diameter of the axle button 28 so that the inner end of the axle shaft 26 is prevented from leaving the central cavity 14. In addition, in this embodiment of spring 40, an opening 50 is cut in the cylindrical portion 48 so the axle button 28 will not bear against the cylindrical portion 48.

As previously mentioned, the principal advantage of my invention is the comparatively flat spring rate of the spring 40. The spring portion of spring 40 is the omega-shaped central portion 44. This omega-shaped spring actually comprises two S-shaped springs arranged back-to-back and connected at one end. The length of this spring is, of course, greater than that of the single S-shaped spring commonly used in differentials or the single diagonal of a Z-shaped spring. It is the greater length of the spring 40 which provides a flatter spring rate to exert a more precise spring force in spite of dimensional variations or spring wear.

The spring 40 has an additional advantage over the Z-shaped spring in that when compression of the spring 40 causes the parallel plates to move toward each other, the plates remain parallel to the inner faces of the side gears for even force distribution over the clutch faces and move without relative lateral motion which might cause them to bind on the axle shafts.

Of course, although offering particular advantages in a limited slip differential, my spring 40 could also be used to retain axle shafts in a standard differential.

My invention provides for a quieter, smoother differential of the type of which retains axle shafts. The preceding description is of a preferred embodiment. However, equivalents will occur to those skilled in the art; and my invention should therefore be limited only by the claims which follow.

I claim:

1. In a limited slip differential including a rotatable casing, a pair of output members rotatably received in said casing and adapted to be driven thereby, a pair of side gears in said casing, each of said side gears being adapted to rotate with one of said output members, a pinion shaft fixedly carried in said casing, a pair of pinion gears rotatably carried on said pinion shaft and intermeshing with said side gears such that rotation of said output members relative to one another causes rotation of said side gears relative to said casing, and friction clutch means carried between said side gears and said casing and loadable to frictionally resist rotation of said side gears relative to said casing, the improvement comprising:

a clutch loading spring and output member retaining device, said device comprising a pair of parallel flat metal plates and a resilient center plate joining corresponding sides of said parallel plates, said resilient center plate being curved between said parallel plates in a generally omega-shaped configuration to form an unclosed generally cylindrical portion between said parallel plates, said device being placed in said casing with one of said parallel plates abutting each said side gear and said cylindrical portion surrounding said pinion shaft, said resilient center plate being compressed to bias said parallel plates against said side gears and thus load said clutch means, each of said parallel plates having a slot extending inward from the side opposite said resilient center plate, said slots being adapted to engage said output members for retention thereof in said casing.

* * * * *